United States Patent [19]
Thieret et al.

[11] Patent Number: 5,923,834
[45] Date of Patent: Jul. 13, 1999

[54] MACHINE DEDICATED MONITOR, PREDICTOR, AND DIAGNOSTIC SERVER

[75] Inventors: Tracy E. Thieret, Webster; Charles P. Holt, Williamson; Michael M. Shahin, Pittsford; Robert P. Siegel, Penfield, all of N.Y.

[73] Assignee: Xerox Corporation, Stamford, Conn.

[21] Appl. No.: 08/665,274

[22] Filed: Jun. 17, 1996

[51] Int. Cl.[6] .................................................. G06F 11/00
[52] U.S. Cl. .......................................... 395/183.01; 399/8
[58] Field of Search ........................ 395/183.01, 183.03, 395/183.13, 183.15, 183.22, 184.01; 364/184; 399/8, 9, 10; 702/182, 183, 185, FOR 135

[56] References Cited

U.S. PATENT DOCUMENTS

| | | | |
|---|---|---|---|
| 4,986,526 | 1/1991 | Dastin | 271/227 |
| 5,038,319 | 8/1991 | Carter et al. | 364/900 |
| 5,057,866 | 10/1991 | Hill, Jr. et al. | 355/200 |
| 5,138,618 | 8/1992 | Honda et al. | 371/16.4 |
| 5,243,382 | 9/1993 | Takano et al. | 355/207 |
| 5,293,323 | 3/1994 | Doskocil et al. | 364/551.01 |
| 5,297,256 | 3/1994 | Wolstenholme et al. | 395/162 |
| 5,394,458 | 2/1995 | Allen et al. | 379/1 |
| 5,471,313 | 11/1995 | Thieret et al. | 358/296 |

FOREIGN PATENT DOCUMENTS

WO 81/02799  10/1981  WIPO .......................... 702/FOR 135

*Primary Examiner*—Andrew W. Johns
*Attorney, Agent, or Firm*—Ronald F. Chapuran

[57] ABSTRACT

In one embodiment, a server electrically connected to an image processing machine provides local data access and includes a monitor component, an analysis and prediction component to analyze data to track machine trends and predict machine subsytem and element faults, a diagnostic component capable of machine diagnostics at a higher level, components, and a communication component to provide a remote communication link. In a second embodiment, a first level of server modules are directly connected to given machines, a second level of server modules with trend analysis and diagnostic capability are connected to a network and associated with a set of machines on the network, and a third level of server modules are associated with a plurality of sets of machines on the network with the analysis and prediction components and diagnostic components providing trend data, fault prediction data, and machine corrective data for the plurality of sets of machines.

14 Claims, 7 Drawing Sheets

MACHINE DEDICATED MONITOR, PREDICTOR, AND DIAGNOSTIC SERVER

BACKGROUND OF THE INVENTION

1. Field of the Invention

The present invention relates to a server for monitoring machine data, predicting trends, and providing corrective response, and to a hierarchical system of provide predetermined degrees of response on the basis of a single machine, set of machines, or a plurality of sets of machines.

2. Description of the Related Art

Recently, systems for monitoring the operation of a plurality of reprographic machines from a remote source by use of a powerful host computer having advanced, high level diagnostic capabilities have been installed. These systems have the capability to interact remotely with the machines being monitored to receive automatically initiated or user initiated requests for diagnosis and to interact with the requesting machine to receive stored data to enable higher level diagnostic analysis. Such systems are shown in U.S. Pat. Nos. 5,038,319, and 5,057,866 (the disclosures of which are incorporated herein by reference), owned by the assignee of the present invention. These systems employ Remote Interactive Communications (RIC) to enable transfer of selected machine operating data (referred to as machine physical data) to the remote site at which the host computer is located, through a suitable communication channel. The machine physical data may be transmitted from a monitored document system to the remote site automatically at predetermined times and/or response to a specific request from the host computer.

In a typical RIC system, the host computer is linked via a public switched telephone system or a combination of public and dedicated systems to local reprographic machines via modems. The host computer may include a compiler to allow communication with a plurality of different types of machines and an expert diagnostic system that performs higher level analysis of the machine physical data than is available from the diagnostic system in the machine. After analysis, the expert system can provide an instruction message which can be utilized by the machine operator at the site of the document system to overcome a fault.

Alternatively, if the expert system determines that more serious repair is necessary or a preventive repair is desirable, a message is sent to a local field work office giving the identity of the machine and a general indication of the type of service action required.

One difficulty with the above described system is the requirement for large date transmission and bandwidth capacity in the remote transmission. U.S. Pat. No. 5,394,453 discloses a machine communications interface for transferring data either locally or remotely to a diagnostic device. However, the key communication elements are standard modems and RS-232 interfaces. A difficulty with this system is a relatively low data bandwidth for remote monitoring and capability of only infrequent monitoring. More importantly, there is disclosed a relatively dumb communications interface for transferring data either locally or remotely. There is lack of capability of trend analysis and diagnostics within the interface and the ability to reduce raw date to machine status before transmission. The system of the above described patent also lacks the ability for interaction with other servers on a network for a progressive technique or hierarchy of analysis and diagnostic applicable to a single machine or family of machines.

It is expected that future office products could be serviced by a variety of individuals that could include the customer, representative of product manufactures, or third party service organizations. The service may include parts repair or replacements, adjustments or software updates and should be made as conveniently and readily available as possible. On order to meet this new level of convenient service in an ever complex set of products, a new strategy needs to be developed to provide rapid, easily interpretable information on the status of the machines, to those that are likely to service the product. To ensure an economically viable strategy, product design must address the issue of service in a modular manner with upgradeable hardware and software and extendible to a series of products that use the same basic technologies and sensor and diagnostic techniques.

OBJECTS AND SUMMARY OF THE INVENTION

It is an object of the present invention, therefore, to provide a machine server that is capable of machine trend analysis and diagnostics while still providing a relatively large capacity data interface locally or to a remote host. It is another object of the present invention to provide a progressive level or hierarchy of servers on a network to monitor trends and diagnose a single machine, a family of machines or various families of machines.

In one embodiment, a server electrically connected to an image processing machine provides local data access and includes a monitor component, an analysis and prediction component to analyze data to track machine trends and predict machine subsytem and element faults, a diagnostic component capable of machine diagnostics at a higher level, the diagnostic component connected to the monitor and analysis and prediction components, and a communication component to provide a remote communication link. In a second embodiment, a first level of server modules are directly connected to given machines, a second level of server modules with trend analysis and diagnostic capability are connected to a network and associated with a set of machines on the network, and a third level of server modules are associated with a plurality of sets of machines on the network with the analysis and prediction components and diagnostic components providing trend data, fault prediction data, and machine corrective data for the plurality of sets of machines.

BRIEF DESCRIPTION OF THE DRAWINGS

The invention will be described in detail with reference to the following drawings wherein.

DETAILED DESCRIPTION OF PREFERRED EMBODIMENTS

Figure 1:
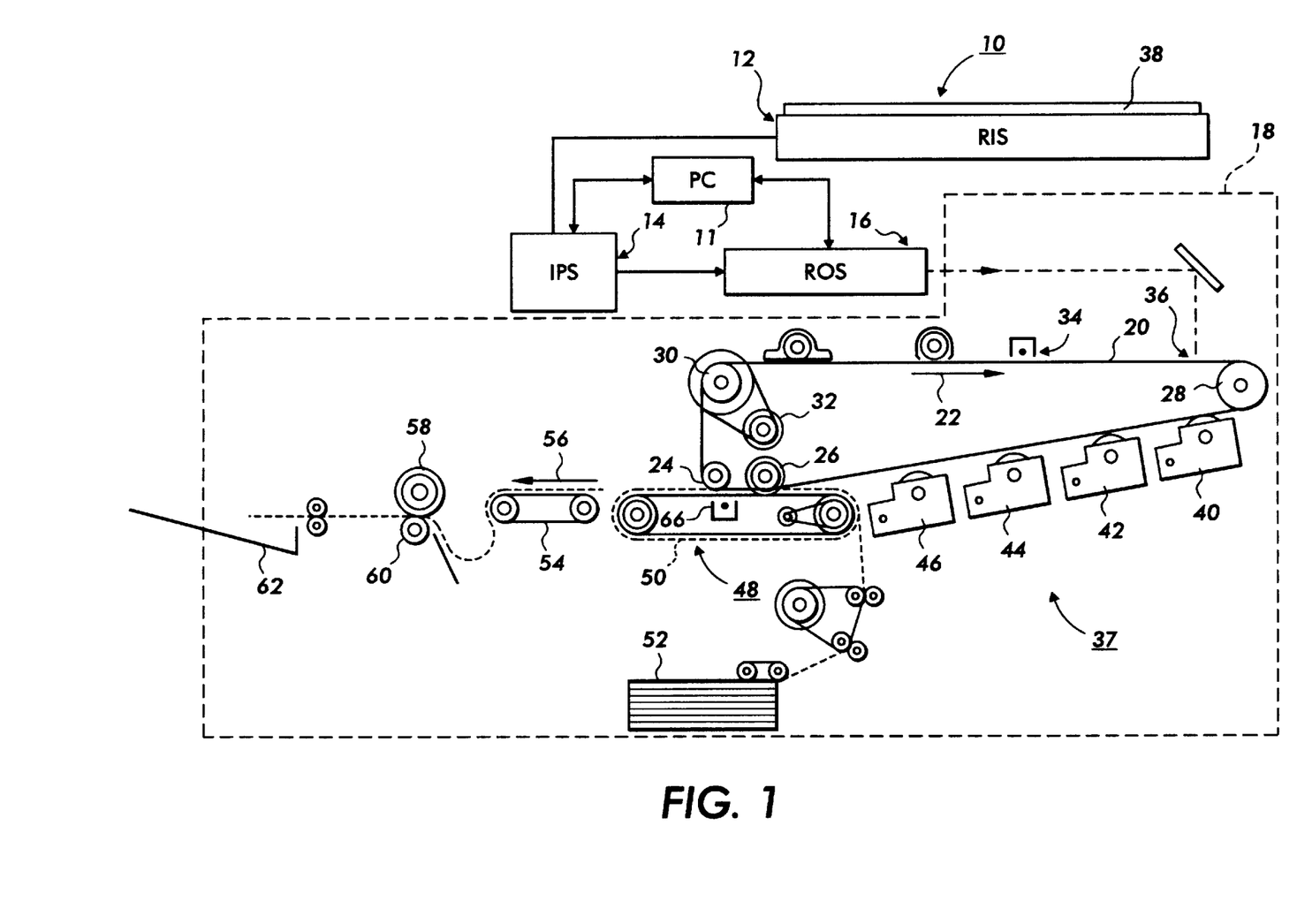
FIG. 1 is a schematic view showing a color reprographic marking engine and printing system incorporating the present invention.

The type of printer suitable for use with the server of the present invention is described in U.S. Pat. No. 4,966,526, hereby incorporated by reference. A similar reprographic color printer 10 using the controls system architecture of the present invention is shown in FIG. 1. It should be understood that the server can be implemented in a wide variety of IOTs and is not necessarily limited to the particular printing system shown in FIG. 1. For example the invention applies to a variety off marking systems besides xerography such as lithography thermal ink jet, liquid development, or thermal transfer.

In FIG. 1, during operation of the printing system, a multicolor original document 38 is positioned on a raster input scanner (RIS) 12. RIS 12 contains document illumination tamps, optics, and a mechanical scanning drive, and a charge coupled device (CCD array). ROS 12 captures the entire original document and converts it to a series of raster scan lines and measures a set of primary color densities, i.e., red, green and blue densities, at each of the original documents. This information is transmitted to an image processing system (IPS) 14. IFS 14 is the control electronics which prepare and manage the image data flow to the raster output scanner (ROS) 16. A signal corresponding to the desired image is transmitted from IPS 14 to ROS 16 which creates the output copy image. ROS 16 lays out the image in a series of horizontal scan lines with each line having a specific number of pixels per inch. ROS 16 includes a laser with a rotating polygon mirror block. ROS 16 exposes the charged photoconductive surface of printer 10 to achieve a set of subtractive primary latent images. The latent images are developed with cyan, magenta, yellow and black developer material, respectively. These developed images are transferred to a copy sheet and superimposed in registration with one another to form a multicolored image on the copy sheet. This multicolored image is then fused to the copy sheet forming a color copy.

With continued reference to FIG. 1, printer or marking engine 18 is an electrophotographic printing machine. The electrophotographic printing machine employs a photoreceptor or photoconductive belt 20. Belt 20 moves in the direction of arrow 22 to advance successive portions of the photoconductive surface sequentially through the various processing stations disposed about the path of movement. Belt 20 is entrained about transfer rollers 24 and 26, tension roller 28 and drive roller 30. Drive roller 30 is rotated by a motor 32 coupled thereto by suitable means such as a belt drive. As drive roller 30 rotates, belt 20 is advanced in the direction of arrow 22. Initially, a portion of photoconductive belt 20 passes through a charging station 34. At charging station 34, corona generating devices or a scorotron charge photoconductive belt 20 to a relatively high substantially uniform potential.

Next, the charged photoconductive surface of belt 20 is moved to the exposure station 36. Exposure station 36 receives image information from RIS 12 having a multicolored original document 36 positioned thereon. RIS 12 captures the entire image from the original document 38 and converts it to a series of raster scan lines which are transmitted as electrical signals to IPS 14. The electrical signals from RIS 12 correspond to the red, green and blue densities at each point in the document. IPS 14 converts the set of red, green and blue density signals, i.e. the set of signals corresponding to the primary color densities of original document 38, to a set of colorimetric coordinates. IPS 14 then transmits signals corresponding to the desired image to ROS 16. ROS 16 includes a laser with rotating polygon mirror blocks. Preferably, a nine-facet polygon is used. ROS 16 emits a beam which illuminates the charged portion of photoconductive belt 20 at a rate of 400 pixels per inch. ROS 16 exposes the photoconductive belt to record four latent images. One latent image is adapted to the developer with cyan developer material. Another latent image is adapted to be developed with magenta developer material with the third latent image adapted to be developed with yellow developer material and the fourth with black material. The latent image is formed by ROS 16 on the photoconductive belt corresponding to the signals from IPS 14.

After the electrostatic latent image has been recorded on photoconductive belt 20, belt 20 advances the electrostatic image thereon to the development station 37. The development station includes four individual developer units 40, 42, 44 and 46 which develop the electrostatic latent images using toner particles of appropriate color as is conventional. After development, the toner is moved to the transfer station 48 where the toner image is transferred to a sheet of support material 52, such as plain paper. At transfer station 48, the sheet transport apparatus comprising a sheet conveyor 50 moves the sheet into contact with photoconductive belt 20. At transfer station 48, a scorotron 66 sprays ions onto the backside of the sheet to charge the sheet to proper magnitude and polarity for attracting the toner image from photoconductive belt 20. In this way, the four color toner images are transferred to the sheet in superimposed registration with one another. After the sheet is fed around sheet conveyor 50 four times, the sheet is then released and fed to a sheet transport 54 in the direction of arrow 56 between fuser roll 58 and pressure roll 60 and then is deposited in a sheet receiving tray 62.

Figure 2:
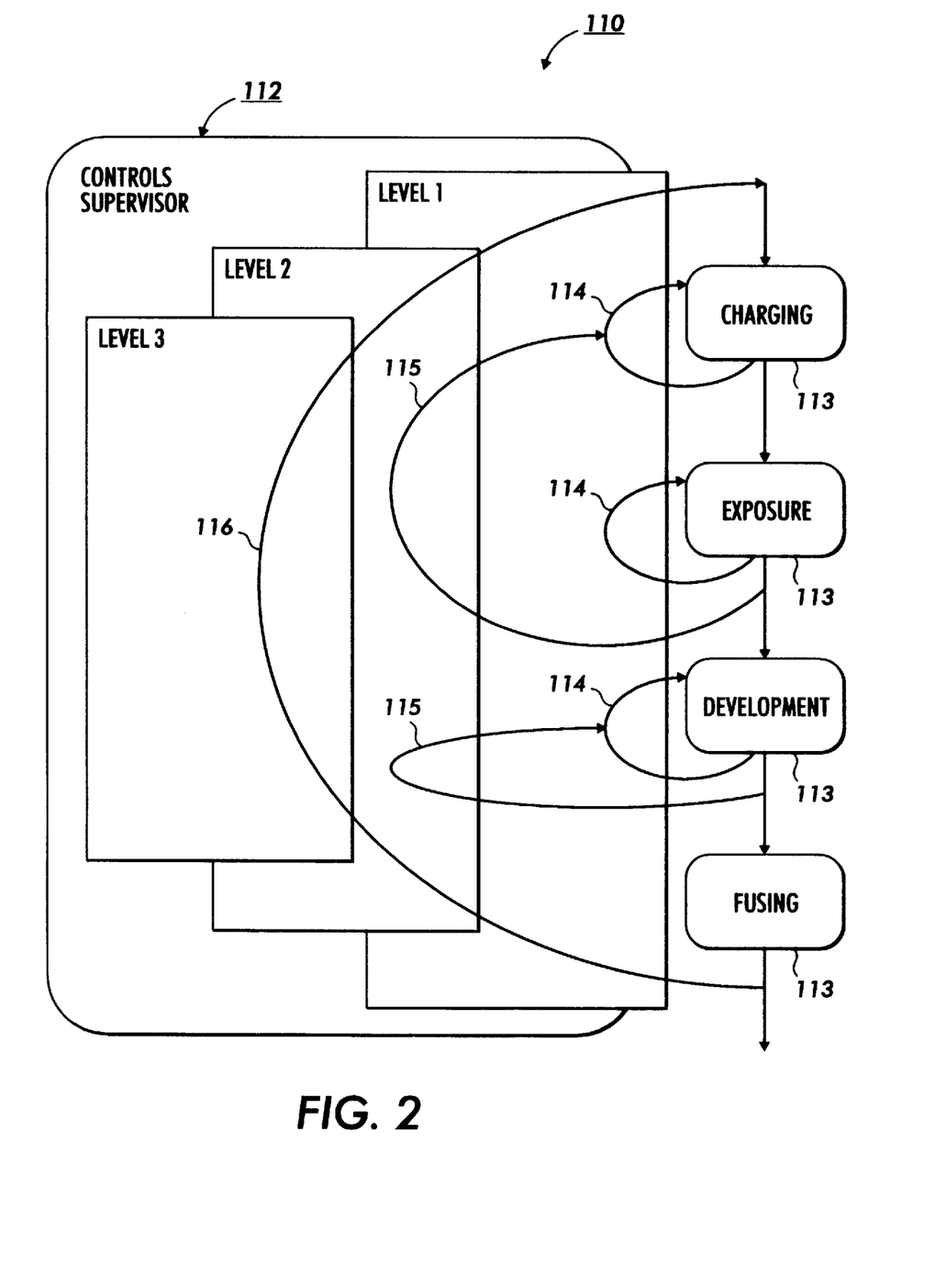
FIG. 2 is a schematic plan showing a control architecture for the system of FIG. 1.

A hierarchical process controls architecture 110, as shown generally in FIG. 2, can be implemented in a printer such as printer 10 shown in FIG. 1 or in any other suitable marking device to provide required data to a diagnostic server. The hierarchical process controls architecture 110 is implemented in the process controls 11 in marking engine 18 as shown in FIG. 1, and indicates a close relationship between a diagnostic server and the marking engine being serviced. In accordance with the present invention, intimate, low level details of operation and state of operation are communicated from a marking engine to a diagnostic server on frequent, regular intervals. The control architecture 110 is an example of the more general notion of close coupling between sewer and marker. The internals of the control structure for different technologies may differ, but are similar in providing intimate and detailed data to a diagnostic server on the state and operation of a machine engine marking device to provide required data to a diagnostic server.

Architecture 110 in process controls 11 communicates with IPS 14 and ROS 16 to control the quality of images output by printer 10. A primary object of architecture 110 is to maintain a desired IOT image quality by maintaining a desired tone reproduction curve (TRC). An image input to be copied or printed has a specific TRC. The IOT outputting a desired image has an intrinsic TRC. If the IOT is allowed to operate uncontrolled, the TRC of the image output by IOT will distort the color rendition of the image. Thus, an IOT must be controlled to match its intrinsic TRC to the TRC of the input image. An intrinsic TRC of an IOT may vary due to changes in such uncontrollable variables such as humidity or temperature and the age of the xerographic materials, i.e. the number of prints made since the developer, photoreceptor, etc. were new. As shown in FIG. 2, to accommodate and correct for the various changes, architecture 110 takes a system-wide view of the IOT marking engine and controls both the various physical subsystems 113 of the IOT and the inter-relationships between subsystems 113.

As seen in FIG. 2, architecture 110 may be divided into three levels, Level 1, Level 2 and Level 3. Architecture 110 also has a controls supervisor 112 for coordinating the interactions between the controllers of various levels. Level 1 includes controllers 114 for each of the subsystems 113. Subsystem 113 for example, can be the charge, exposure, development, of fusing stations of a xerographic device. Level 2 includes at least two controllers 115 which cooperate with the Level 1 controllers 114. Level 3 includes at least one controller 116. Each of the controllers function and communicate with other controllers through specific interfaces provided in controls supervisor 112 in addition to direct connections.

In general, at Level 1 the algorithms are responsible for maintaining their corresponding subsystems at their setpoints. Level 2 determines what those setpoints should be and notifies the L1 algorithms of it's decisions to change them. L2 examines for example, the toner patches in the interdocument zones of the photoreceptor placed there by the patch scheduling algorithm and the optical sensor reads those patches to determine the amount of toner placed there by the development system. The patches may be either full solid area patches or 50% (for example) halftone patches. From the densities of these patches, the level 2 algorithms determine the appropriate setpoints for the electrostatic voltages and toner concentration. Level 2 does not acknowledge the TRC as an entity, only as three points (maximum darkness white and some intermediate darkness (50% in the example). Level 3 treats the TRC as a curve made up of a number of discrete points (the three from level 2 and usually about 4–6 more. For further details on control architecture 110, reference is made to U.S. Pat. No. 5,471,313 incorporated herein.

Level 1 controllers 114 are required to maintain a scalar setpoint for each subsystem 113 to allow for short term stability of subsystems 113 which is required by Level 2 algorithms. Each subsystem 113 has a separate controller 114 which directly controls the particular parameter or performance setpoint of that particular subsystem. Level 1 controllers 114 are sent information by various information sensors which sense the subsystem performance parameters locally as shown by the direct control loops depicting controllers 114 shown in FIG. 2. The sensed parameters are sent through a single process step or algorithm from which actuation control parameters are output to control various IOT subsystems 113. Two separate algorithms may be provided for each Level 1 controller 114. One algorithm provides rapid response time when a Level 1 subsystem setpoint is changed to allow for quick stabilization required by Level 2 controllers 115. The second algorithm provides for noise immunity during a normal subsystem operation in which a setpoint is not changed. The control supervisor provides the means for determining which algorithm will adjust the activator value.

Level 2 controllers 115 operate regionally, rather than operating locally as do Level 1 controllers 113. Level 2 controllers 115 control an intermediate process output. Input to the algorithms of Level 2 controllers 115 consist of a composite set of scalar quantities including temperature, humidity, developer age and any other factor affecting Level 2 controllers 115. Two examples of regional control configurations are shown in FIG. 2, but any appropriate configuration which operates regionally may be used. Level 2 controllers 115 receive input data from either an information processing system in printer 10 or a scanner in a copier or a user interface. The input data informs Level 2 controllers 115 what the customer desires to be output. It is important to note that an image output desired by the customer may not always be exactly the same image that is input. That is, the customer may want to customize or change the appearance of the image.

The data input to Level 2 controllers 115 comprises multiple bits per pixel of a desired image to be output by an image output terminal. It is assumed that the input data are to be reproduced exactly as transmitted. That is, the colorimetric coordinates of the input image should match the measured colorimetric coordinates in the corresponding regions-of the image output by the IOT. In order for the architecture of the present invention to accomplish this colorimetric coordinate matching function, the TRC intrinsic in a particular IOT must be determined. A TRC of a particular IOT is sensed by an optical sensor viewing test patches placed on the photoreceptor. Once an intrinsic TRC of a particular IOT is determined, the Level 2 controllers 115 control discrete points on the intrinsic TRC to match the TRC of the input image date. That is, the tone reproduction curve allows the IOT to output an image that corresponds to the image desired by the customer. Level 2 controllers 115 do this by sensing and deriving various discrete setpoints corresponding to the intrinsic IOT tone reproduction curve. Then Level 2 controllers 115 sense the performance of the setpoints of the tone reproduction curve with respect to corresponding setpoints on the desired TRC.

Level 2 controllers 115 send Level 1 subsystem performance parameter recommendations to controls supervisor 112. As described later, controls supervisor 112 either accepts or adjusts these parameter recommendations and sends them to the Level 1 subsystem actuators to change the performance of Level 1 subsystems 113. By changing the Level 1 subsystems performances by a controlled amount, the Level 2 setpoints are maintained at their desired locations on the tone reproduction curve. To sense and create the intrinsic TRC, Level 2 controllers 115 select the darkest or densest bit from the input data stream and assigns this density a value corresponding to the highest setpoint on a tone reproduction curve. Level 2 controllers 115 also select a certain density level, for example 50%, and assign this bit another density value corresponding to another setpoint on the tone reproduction curve. The lowest setpoint on the tone reproduction curve is always 0 and corresponds to background or white area on the image input Level 2 controllers 115 set the white areas or 0 density areas of the input image and maintain this background area by maintaining a constant value of $V_{clean}$. Thus, Level 2 controllers 115 set up at least three points on the tone reproduction curve which are used to control the image output process.

Level 2 controllers 115 then sense the performance of the IOT corresponding to the few discrete points set up by Level 2 controllers 115 on the tone reproduction curve of the input image. That is, Level 2 controllers sense what density level is output and what density level is input and compares the two. If the setpoint of the intrinsic TRC moves or is different from the input density level, then the controllers 115 send a Level 1 parameter recommendation to correct for this difference. Level 2 controllers continuously check the output of the few discrete points to control these points on the tone reproduction curve.

While the Level 2 controllers control the solid area and halftone area or the upper and middle regions of the TRC, and $V_{clean}$ maintains the lower end of the TRC, other setpoints along the tone reproduction curve must be set up and controlled to produce an image with a desired color stability. These other regions are known as the highlight and shadow regions which experience variations in output density values just as the other areas do. The Level 3 controller 116 provides setpoints to control the output of the highlight and shadow regions and controls these setpoints to produce a high quality image output. Level 3 controller 116 senses the performance of the image output terminal corresponding to the highlight and shadow region setpoints and compares the performance data to the input data. Level 3 controller 116 then corrects for any difference between output performance data and input data by changing how RIS 12 interprets the input image.

Figure 3:
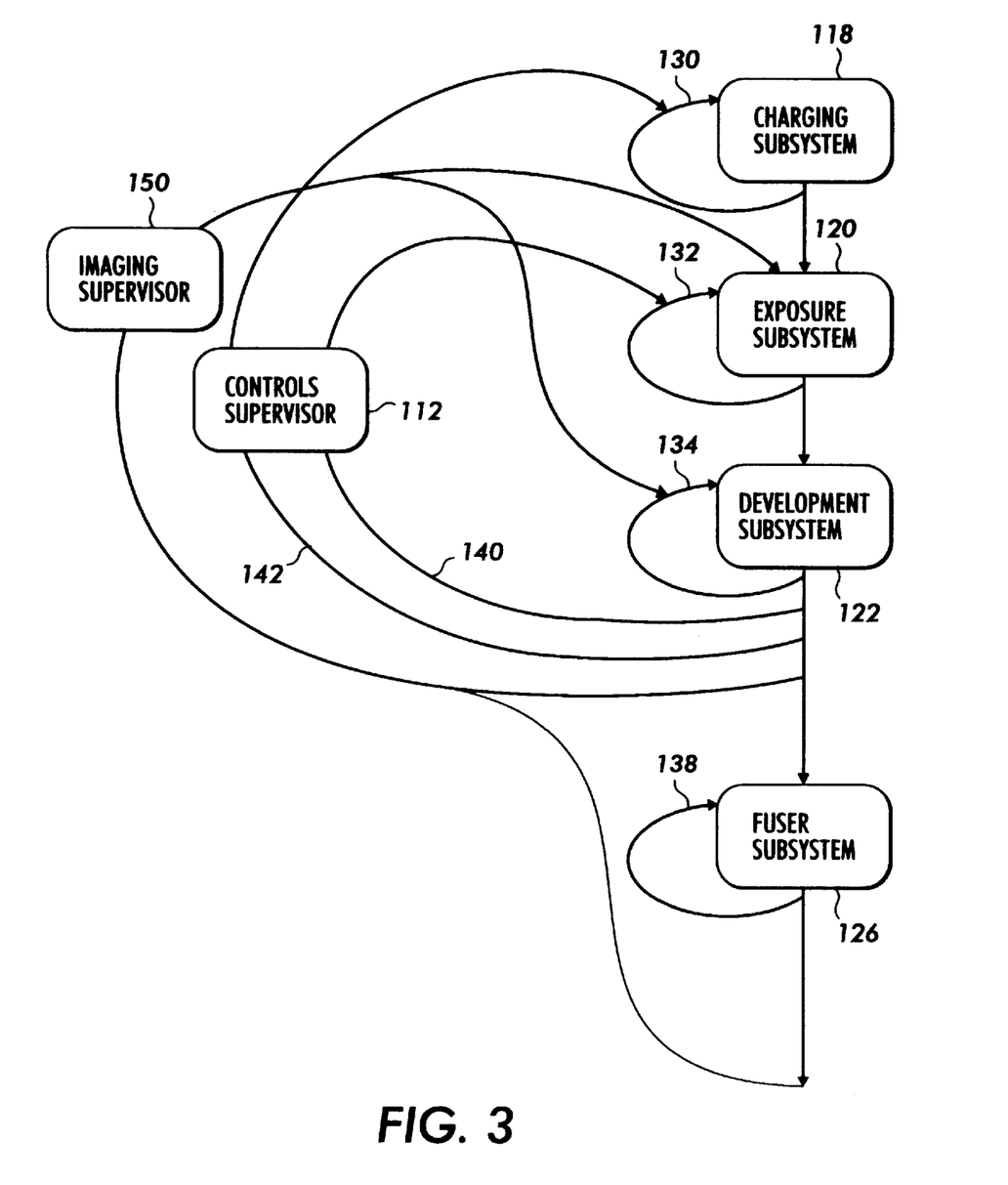
FIG. 3 is another view of the control architecture for the system of FIG. 1.

In one embodiment depicted in FIG. 3, Level 1 subsystems to be controlled may include a charging subsystem 118, an exposure subsystem 120, a development subsystem 122, and a fuser subsystem 126. Further, any other physical subsystems of a printer or copier can be easily controlled and included in the architecture. The Level 1 subsystems controllers may include any or all of the following controllers: a charging controller, an laser power controller, a toner concentration controller, a transfer efficiency controller, a fuser temperature controller, a cleaning controller, a decurler controller and a fuser stripper controller. Other IOT controllers which control various physical subsystems of the IOT not mentioned here can be used by simply designing the controllers such that they can be controlled by controls supervisor 112 as shown in FIG. 2 and can be inserted in a plug and play manner as described above.

In order to offer customers value added diagnostic services using add-on hardware and software modules which provide service information on copier/printer products a hierarchy of machine servers are described in accordance with the present invention. In the following "machine" is used to refer to the device whose performance is being monitored, typically, but not limited to, a copier or printer. "Server" is used to refer to the device which is performing the monitoring and analysis function and providing the communication interface between the "machine" and the service environment. Such a server would consist of a computer with ancillary components, as well as software and hardware parts to receive raw data from various sensors located within the machine at appropriate, frequent intervals, on a continuing basis and to interpret such data and report on the functional status of the subsystem and systems of the machine. In addition to the direct sensor data received from the machine, a knowledge of the parameters in the process control algorithms (levels 1, 2 and 3) is also passed in order to acknowledge the fact that process controls attempt to correct for machine parameter and materials drift and other image quality affectors. One quality of control systems is that the effects of drift are masked through compensatory actuation until the operational boundaries (latitudes) are reached. Thus the control system algorithm parameters may be interrogated to assess the progress of the system toward the latitude bounds. If the distance from the bounds can be determined and the rate of system degradation toward those bounds assessed, then a prediction may be made which forecasts the time of failure of the component approaching latitude bounds. Such a server, would have sufficient storage capacity to allow machine data and their interpretations to be stored until such time that the server is prompted to report through a local display or a network. The server could also be programmed to provide alert signals locally or through a network connection when the conditions of the machine, as detected by the server, required immediate attention.

In addition, when degradation of components or performance is detected, predictions of the impending failure cause a series of actions to occur depending on the service strategy for the machine. These actions could range from key operator notification of the predicted need for service to actually placing an order for the appropriate part for "just in time" delivery prior to actual part failure. The server is equipped to perform a set of specific functions for each family of products and would provide instructions for customer or a service representative to perform whatever repair, part replacement, etc. that may be necessary for the maintenance and optimum operation of the machine. Such functions include status of periodic parts replacement due to wear or image quality determinations which may require adjustment of operational parameters of various modules or replacement of defective components.

The software that is loaded in such a server would, in part, be generic to common modules among all machine and in part, specific to the machine that the customer has purchased. The server could be configured to serve on or several machines within the same campus and be capable of receiving such data from various machines over radio transmitter, phone lines, or network connection. The server thus will provide the interpretation of the complex raw data that continually emanates from various components and modules of the machine(s), and will be able to provide the customer information on the nature of the actions that need to be taken to maintain the machine for optimum performance.

The concept of "Basic Diagnostics" are "Value Added Diagnostics" is implemented by providing only uninterpreted (raw) data at the machine interface as a basic diagnostic component. The server accepts this raw data and interprets it to provide reduced service time (even zero if the customer performs the service action) resulting from the specific and correct diagnosis of both actual as predicted failures of machine parts. This server is given very intimate details of the inter workings of the machine being monitored and thus provides similarly detailed information about the state of each individual component. This information is useful not only for field service diagnostics but also before and after product life in manufacturing by testing the behavior of the individual components and comparing it to standard, known, correct behavior in remanufacturing remembering exactly the part failed and providing information as a database entry specific to a part and serial number.

There are basically two flavors of the server. A "local" server (including hand held device) is connected to a single machine to perform monitoring, analysis, diagnostic, and communication functions. A second embodiment resides on a network and servers the diagnostic needs of a population of machines to which is connected. A scaleable set of solutions provide cost benefit points for customer decisions.

These servers, in accordance with the present invention would provide an intermediate level of diagnostic capability between those located within the machine and those maintained at a remote service location. Intermediate not only in the size of the domain being served but also in complexity, bandwidth, scope of analysis, and response time. While the diagnostic capability which is embedded within the produce itself has the most immediate access to the raw sensor data, the highest potential bandwidth, and the fastest possible response time, it is limited by cost and functional requirements in the level of analysis, breadth of scope and depth of storage which can be maintained. The remote diagnostic server on the other hands has the potential for virtually unlimited storage for monitoring and trend analysis, a more global perspective on the population of machines in question, and more computational horsepower for a detailed analysis of whatever data can be made available. The local and network based servers enable a continuum of diagnostic product offerings between the existing internal and remote systems.

Current practice is to transmit raw (NVM) data to remote locations from which diagnostic information about each machine is derived using sophisticated technologies. The limitations of the current situation lie predominantly in the area of data content, bandwidth, and response time. Remote access currently is conducted over telephone lines with their associated low speed and connection charges. Data sampling typically occurs on the order of once a day (week) and is not sufficiently responsive to take preventative action in many instances and or accurately determine the trends in rapidly changing parameters.

The diagnostic server, in accordance with the present invention, augment the internal machine diagnostic capabilities and provide value to the customer measured in decreased downtime due to improved diagnostic and prognostic information which could be used in a service strategy to either reduce customer visit length or to provide the capability for customer parts replacement, avoiding a customer visit altogether.

A multiplicity of machines (typically, but not restricted to, copiers and printers) on the network are in contact with a single network server. The existing computational capabilities on the net, or newly purchased ones specifically for this purpose, are equipped with software with the capability of sampling machine state on a per job basis or even more frequently if that is required. A network based diagnostic server acts as the contact point for an entire site back to a central "headquarters" type of field service operation thus reducing the number of external connections required by the customer. The network server maintains a continuously updated detailed machine state database. This data base would include non error state information such as loaded paper sizes, color, job queue length jam state and current quality capability. The data base of capabilities (including everything needed to describe the machine state) enables services beyond diagnostics including job scheduling, print queues management, resource allocation, and user notification to provide optimal mapping of job to machine based on the customers requirement for the job being printed.

Figure 4:
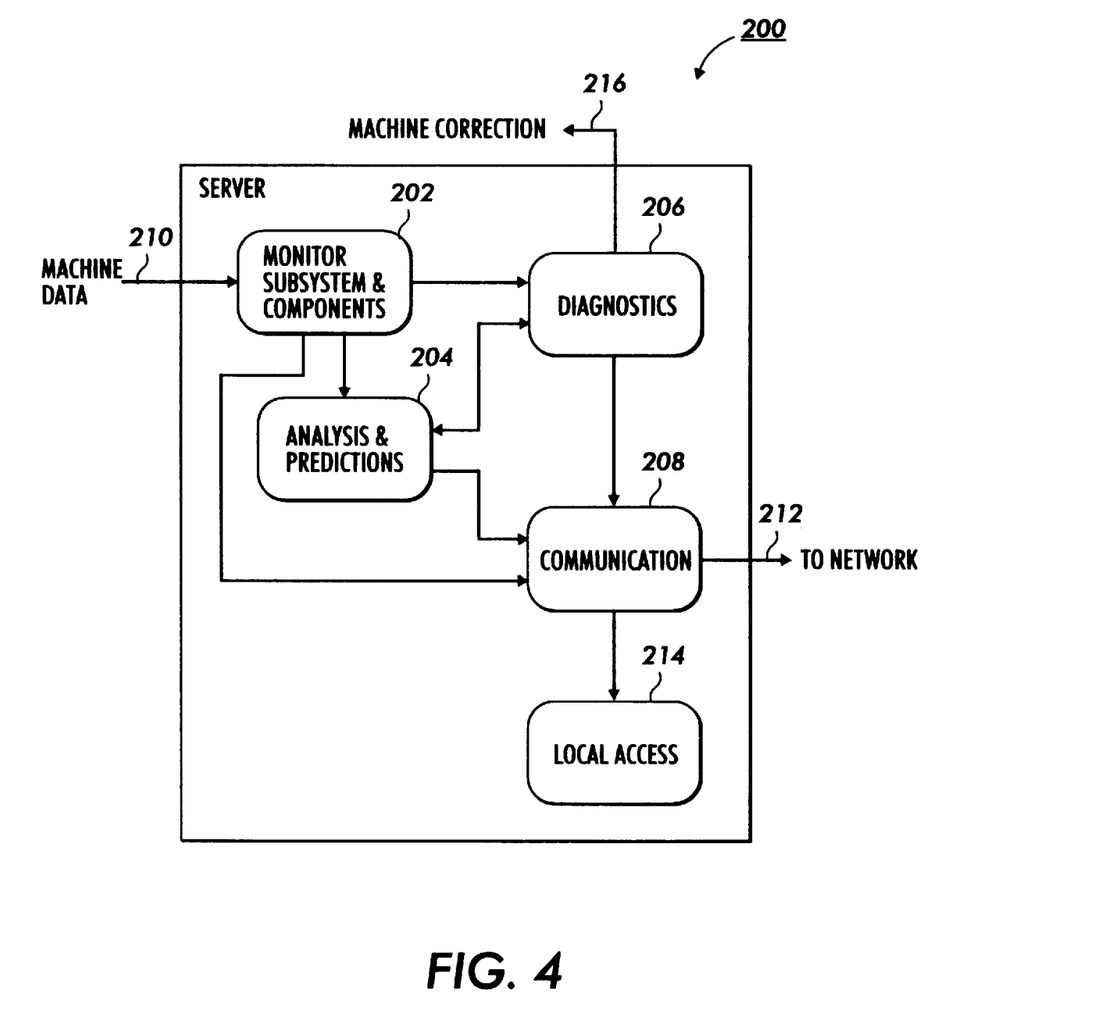
FIG. 4 is a schematic view of a machine server and interface in accordance with the present invention.

With reference to FIG. 4, a server generally shown at 200, includes a subsystem and component monitor 202, an analysis and predictions component 204, a diagnostic component 206, and a communication component 208. It should be understood that suitable memory is inherent in the server 200 in the monitor, analysis and predictions, diagnostics, and communication components. The monitor element contains a pre-processing capability including a feature extractor which isolates the relevant portions of data to be forwarded on to the analysis and diagnostic elements. In general, the monitor element 202 receives machine data as illustrated at 210 and provides suitable data to the analysis and predictions component 204 to analyze machine operation and status and track machine trends such as usage of disposable components as well as usage data, and component and subsystem wear data. Diagnostic component 206 receives various machine sensor and control data from the monitor 202 as well as data from the analysis and prediction 204 to provide immediate machine correction as illustrated at 216 as well as to provide crucial diagnostic and service information through communication component 208 on line 212 to an interconnected network to a remote server on the network or to a centralized host machine with various diagnostic tools such as an expert system. Included can be suitable alarm condition reports, requests to replenish depleted consumable, and data sufficient for a more thorough diagnostics of the machine. Also provided is a local access 214 or interface for a local service representative to access various analysis, prediction, and diagnostic data stored in the server 200 as well as to interconnect any suitable diagnostic device.

Figure 5:
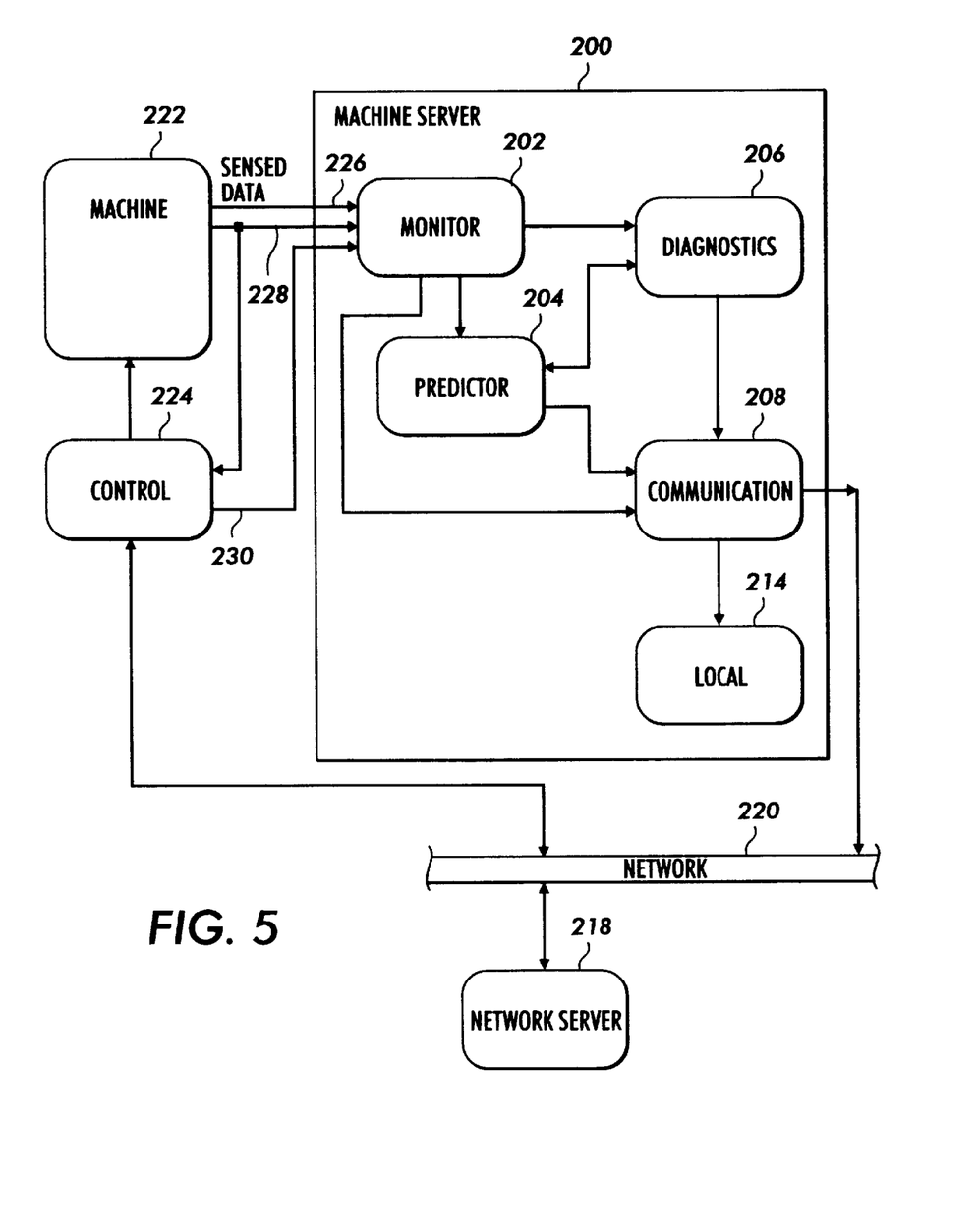
FIG. 5 is another schematic view of a machine server and interface in accordance with the present invention.

With reference to FIG. 5, there is disclosed a typical machine server 200 interconnected to a printing or any other suitable electronic imaging machine 222 as well as connected to network 220. It should be understood that the scope of the present invention contemplates various configurations of a machine server as well as interconnections to machines networks and other network servers. It should be understood that the present invention encompasses various alternatives of a machine server such as analysis and predictor elements, a diagnostic element capable of a hierarchy of diagnostic levels, and various configurations to receive sensed data and controlled data from a machine. For example, in FIG. 5 certain sensed data illustrated at 228 is provided both to the monitor 202 and machine control 224. Other data illustrated at 226 is provided directly only to monitor 202, which also receives control data on line 230. Both the communication element 208 and control 224 are shown as connected to the network 220. Network server 218 connected to network 220 provides a higher level of analysis and diagnostics to machine 22 than the machine server 200 and provides a higher level of analysis and diagnostics to other machines on the network as is illustrated in FIG. 6.

Figure 6:
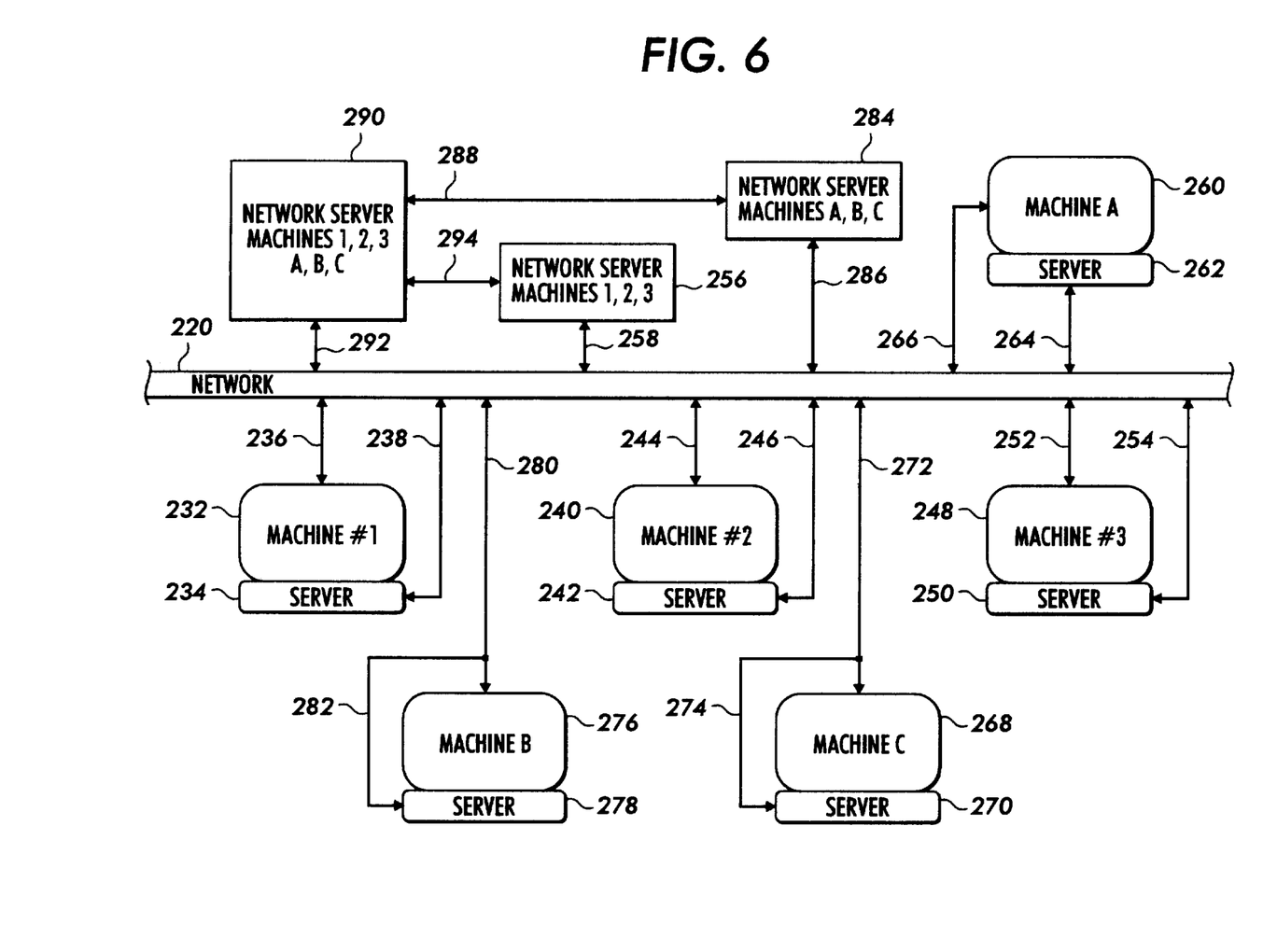
FIG. 6 is a schematic view of a hierarchy of a plurality of machine servers and network servers in accordance with the present invention.

FIG. 6 illustrates machine 1, 232, machine 2, 240 and machine 3, 248 interconnected to network 220 through lines 236, 244, and 252. Attached to machine 1 is server 234, to machine 2 server 242, and to machine 3 server 250. It should be understood that within the scope of the present invention, each of these machines servers can be an integral part of a machine, a standalone component but permanently attached to a given machine, or an adjunct or portable component easily moved to another machine. Servers 234, 242, and 250 are also interconnected to network 220 through lines 238, 246, and 254. In one embodiment, a network server 256, interconnected to the network via line 258, is dedicated to machines 1, 2 and 3. Network server 256 could have the same basic elements: monitor, analysis and predictor, diagnostic element and communication element as well as a local access element as a typical machine server. In a preferred embodiment, network server 256 provides a next level of sophistication in monitoring, predicting trends and diagnosing a given family of machines. Further illustrated in FIG. 6, machine A 260 with server 262, machine B 276 with server 278, and machine C 265 with server 270 are interconnected to network 220 through lines 264, 266, 272, 274, and 280, and 282. Also interconnected to the network 220 is network server 284 via line 286, network server 284 providing a further level of analysis and diagnostic for machines A, B, and C. In one embodiment, machines 1, 2 and 3 are of one class of imaging device and machines A, B and C are of a second class of family imaging devices. Thus, network servers 256 and 284 may be significantly different in operation, being set up to monitor a entirely different class of machine. Also interconnected to network servers 258 and 284 is network server 290 providing a next level higher analysis, diagnostic capability and even job routing than either server 256 or 284 for machines 1, 2, 3, A, B and C. Network server 290 interconnected to network 220 via line 292 in one embodiment could also be a host machine at a central diagnostic station with various expert analysis tools for trend analysis, signature analysis, configuration analysis, and parts supply tracking.

Figure 7:
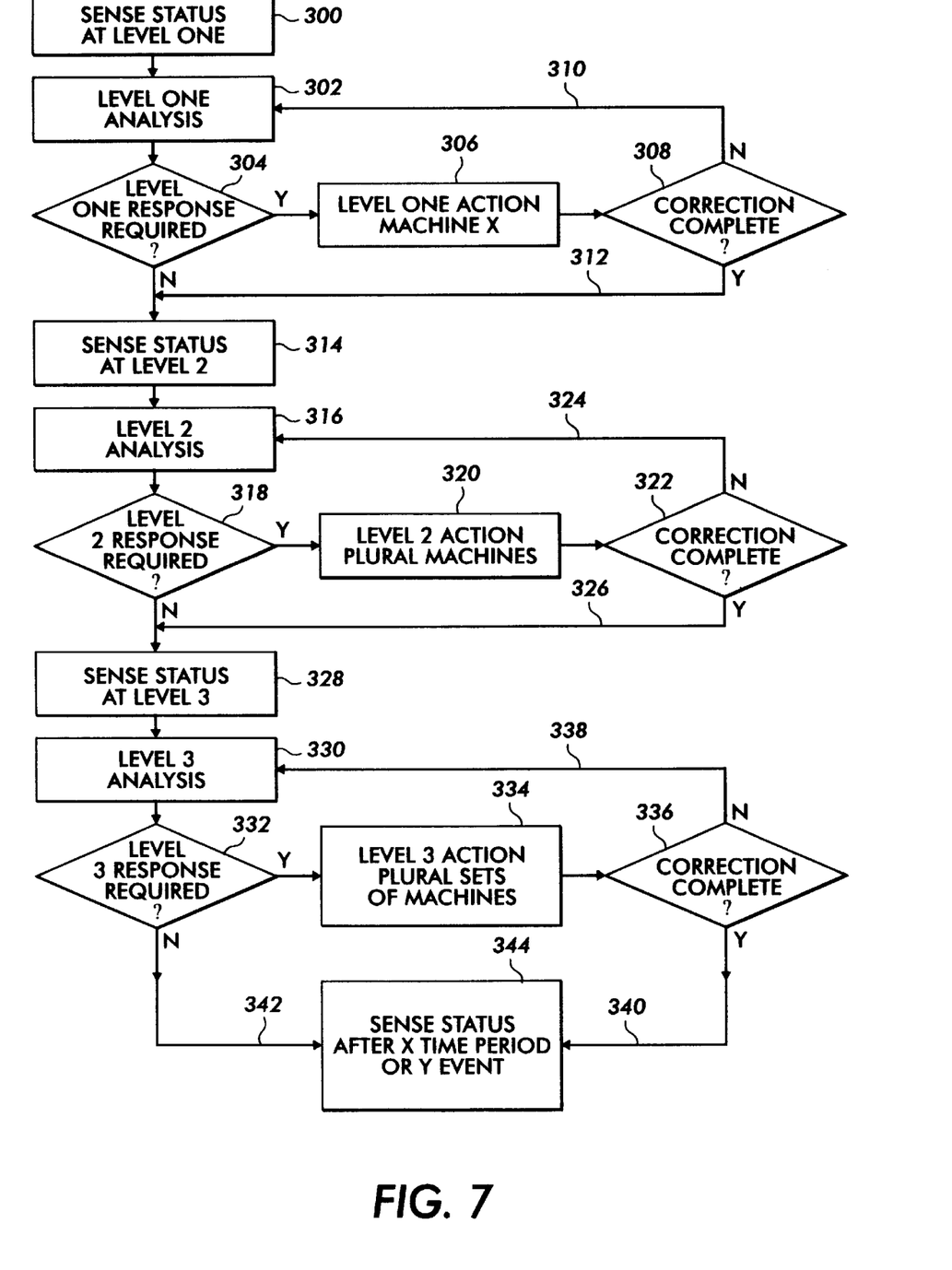
FIGS. 7 is a flow chart illustrating a hierarchy of trend analysis and diagnostics in accordance with the present invention.

With reference to FIG. 7, there is disclosed in flowchart form, a given scenario for a interconnection of various machine servers and network servers on a network to provide progressive levels of monitoring, analysis, and diagnostics for a given machine. At block 300, there is illustrated the sensing of status for a given machine at level 1. It should be understood that a level 1 status could be sensing a certain number of machine sensors and controlled data. Block 302 illustrates a level 1 analysis and in decision block 304, there is a determination based upon the level 1 analysis at 302 whether or not a level 1 response is required. It should be understood that a level 1 analysis could simply be an analysis and corrective feedback automatically provided by the sensors and control in a given machine.

However, in the present invention, a level 1 analysis is an analysis performed by a machine server over and above the ordinary or routine analysis in a given machine. Thus, with reference to FIG. 4, a level 1 analysis would be the further analysis done by monitor component 202, analysis and prediction component 204, diagnostic component 205 beyond a typical machine analysis. This could include some level of trend tracking such as tracking machine fault trends, tracking component wear, and tracking machine usage as discussed above. This level of information could be forwarded over a network to a more sophisticated monitor and could also be available over a local or remote access by a service representative or even a trained operator.

Assuming a level 1 response is required at block 304, a level 1 action is taken for a given machine as shown in block 308. Block 308 determines the action is complete regarding the level 1 analysis at 302. If the correction is not complete, for example there are several level 1 actions based upon the level 1 analysis, the level 1 analysis at 302 continues. Upon the determination at decision block 304 that there is no further level 1 response required or on a determination at decision block 308 that the correction is complete, the system senses the machine status at a level 2. At a level 2 analysis, additional sensors or additional control and first level diagnostic analysis information is considered. At block 316 there is an analysis of the data provided at the sensed status at level 2 block 314. As in the level 1 loop, decision block 318 determines if a level 2 response if required. If no, the analysis continues to the sensing of status at a level 3. However, if the level 2 analysis requires a response, at block 320 a level 2 action is taken.

In accordance with the present invention, the level 2 analysis is equivalent to a network analysis server such as provided by either network server 256 or 284 in FIG. 6. At this level, a response required could be a response for more than one machine, for example, network server 256 could determine a response for machines 1, 2 and 3 or a combination of machines 1, 2 and 3 and network server 254 could determine a response necessary for a combination of machines A B and C. If the corrective action is complete as determined at decision block 322, or if there is no level of response required at decision block 318, the system enters into a sense status at level 3 mode at block 328. It should be understood that, the monitor, analysis, and diagnostic loops at 3 levels are shown sequentially. However it should be understood that portions of the analysis can be done concurrently at various levels since common sensor and control data and available diagnostic data may be available concurrently.

The sense status at level 3 block 328 provides data for the level 3 analysis shown at block 330. With respect to FIG. 6, the level 3 analysis is equivalent to the analysis of network server 290 receiving various analytical and diagnostic data from both servers 256 and 284. As in the previous loops, decision block 332 determines whether or not a level 3 response if required, and if so block 334 illustrates a level 3 action. A level 3 action, for example by network server 290 in the present example could require action to machines 1, 2, 3, A, B, and C or any combination thereof. As discussed above, it is the next level of analysis and diagnostics in the hierarchy level of monitoring, analysis, trend setting, scheduling prediction, and diagnostics. If the correction at level 3 is complete or if there is no level response required, the system will remain idle until the sense status at level 1 is initiated after a given time period or after the completion of a given event or the occurrence of the given event.

The invention has been described with reference to the preferred embodiments thereof which are illustrative and non-limiting. Various changes may be made without departing from the spirit and scope of the invention as defined in the appended claims.

What is claimed is:

1. A first server electrically connected to an image processing machine, the image processing machine including a control with a first level data collection element, sensors for providing first level data to the data collector element, and a first level diagnostic element, the server providing local access, the first server comprising:

a monitor component connected to the control for receiving the first level data and for receiving a second level of data generated by said sensors, an analysis and prediction component connected to the monitor component to analyze the first and second level data to track machine trends and predict machine subsytem and element faults, a diagnostic component capable of machine diagnostics at a second level, the diagnostic component connected to the monitor and analysis and prediction components, and a communication component connected to the monitor, diagnostic, and analysis and prediction components to provide a remote communication link, the first server being adopted to connect to a network server over the communication link.

2. The first server of claim 1, including memory for storing said second level of data and data related to machine analysis and predicted events.

3. The first server of claim 1 wherein the monitor receives data independent of the data collection element including data for changing machine behavior.

4. The first server of claim 1 wherein the first server is portable.

5. The first server of claim 1 wherein the communication component prepares trend data, fault prediction data, and machine corrective data for local access.

6. The first server of claim 1 wherein the communication component prepares trend data, fault prediction data, and machine corrective data for remote transmission.

7. In an image processing machine having an associated server module, sensors, and a control with a first level diagnostic element for diagnosing a first level of data generated by the machine sensors, a method of diagnosing machine operation comprising the steps of:

receiving in the server module first level diagnostic data and a second level of data generated by the machine sensors, analyzing the first level diagnostic data and the second level of data generated by the machine sensors to track machine trends and provide predicted machine event and fault data, responding to the analysis of the first level diagnostic data and data generated by the machine sensors to provide a second level of diagnostics data, and providing a network communication link in the server module to provide said predicted machine event and fault data and said second level of diagnostic data to a remote location, and providing a local communication link in the server module to access said predicted machine event and fault data and said second level of diagnostics data.

8. The method of claim 7 including the steps of storing in a memory in the server module said second level of diagnostic data and date related to machine analysis and predicted events.

9. The method of claim 7 including the step of providing a remote communication link in the server module to access said predicted machine event and fault data and said second level of diagnostics data.

10. The method of claim 7 including the step of directly connecting the server module to the image processing machine.

11. The method of claim 10 including the step of disconnecting the server module from the image processing machine.

12. In an image processing machine having sensors and a control with a first level diagnostic element receiving a first level sensor data and a server module, the server module electrically connected to the control, a method of diagnosing machine operation comprising the steps of:

receiving in the server module first level diagnostic data and second level sensor data generated by the machine sensors, analyzing the first level diagnostic data and the second level sensor data generated by the machine sensors to track machine trends and provide predicted machine event and fault data, and responding to the analysis of the first level diagnostic data and the second level sensor data generated by the machine sensors to provide a second level of diagnostic data.

13. The method of claim 12 including the step of providing a local communication link in the server module to access said predicted machine event and fault data and said second level of diagnostics data.

14. The method of claim 12 including the steps of storing in a memory in the server module said second level of diagnostic data and data related to machine analysis and predicted events.

* * * * *